Dec. 11, 1945. H. R. TRAPHAGEN 2,390,968
POWER LIFT PLANTER
Filed March 27, 1943 3 Sheets-Sheet 3

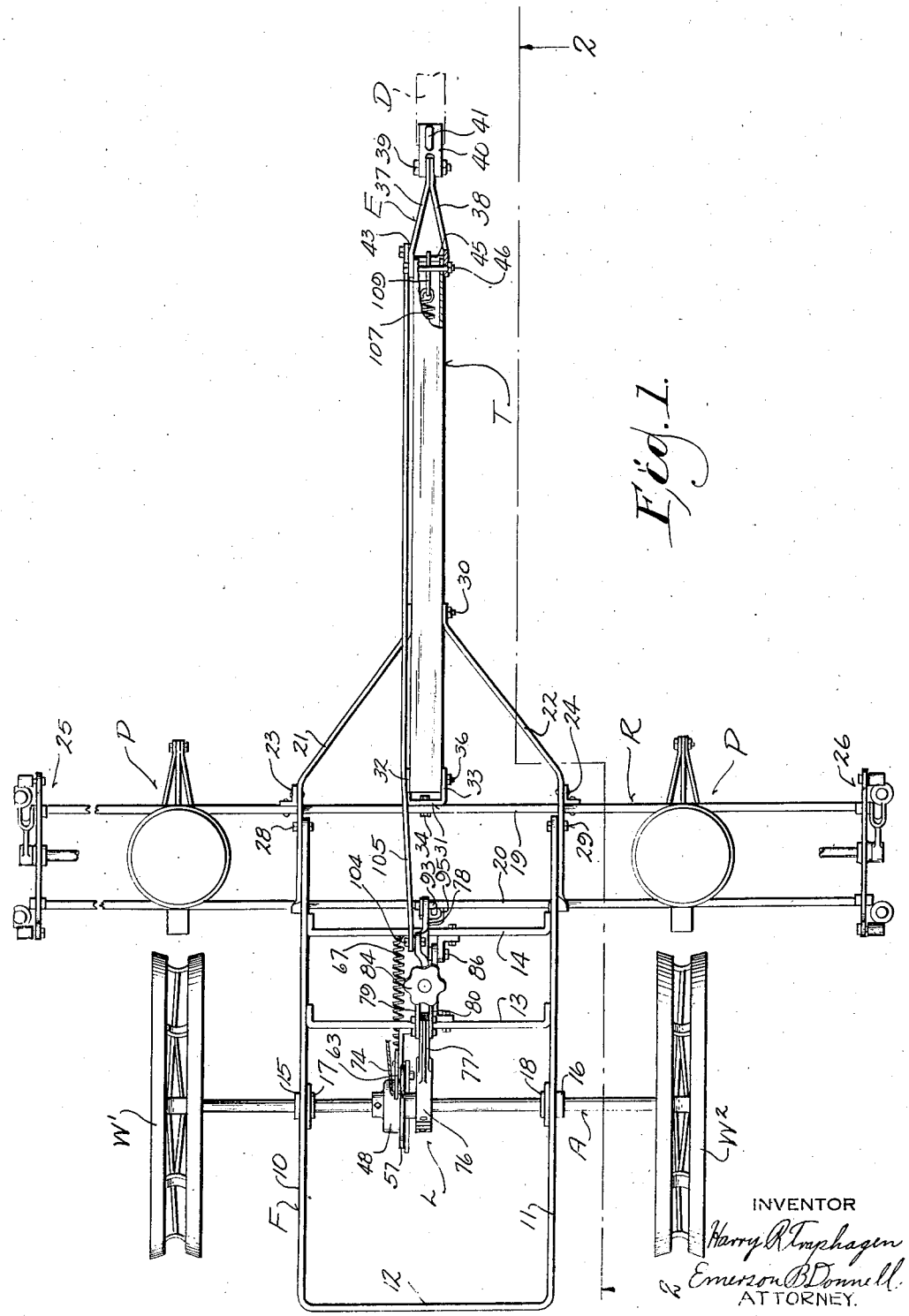

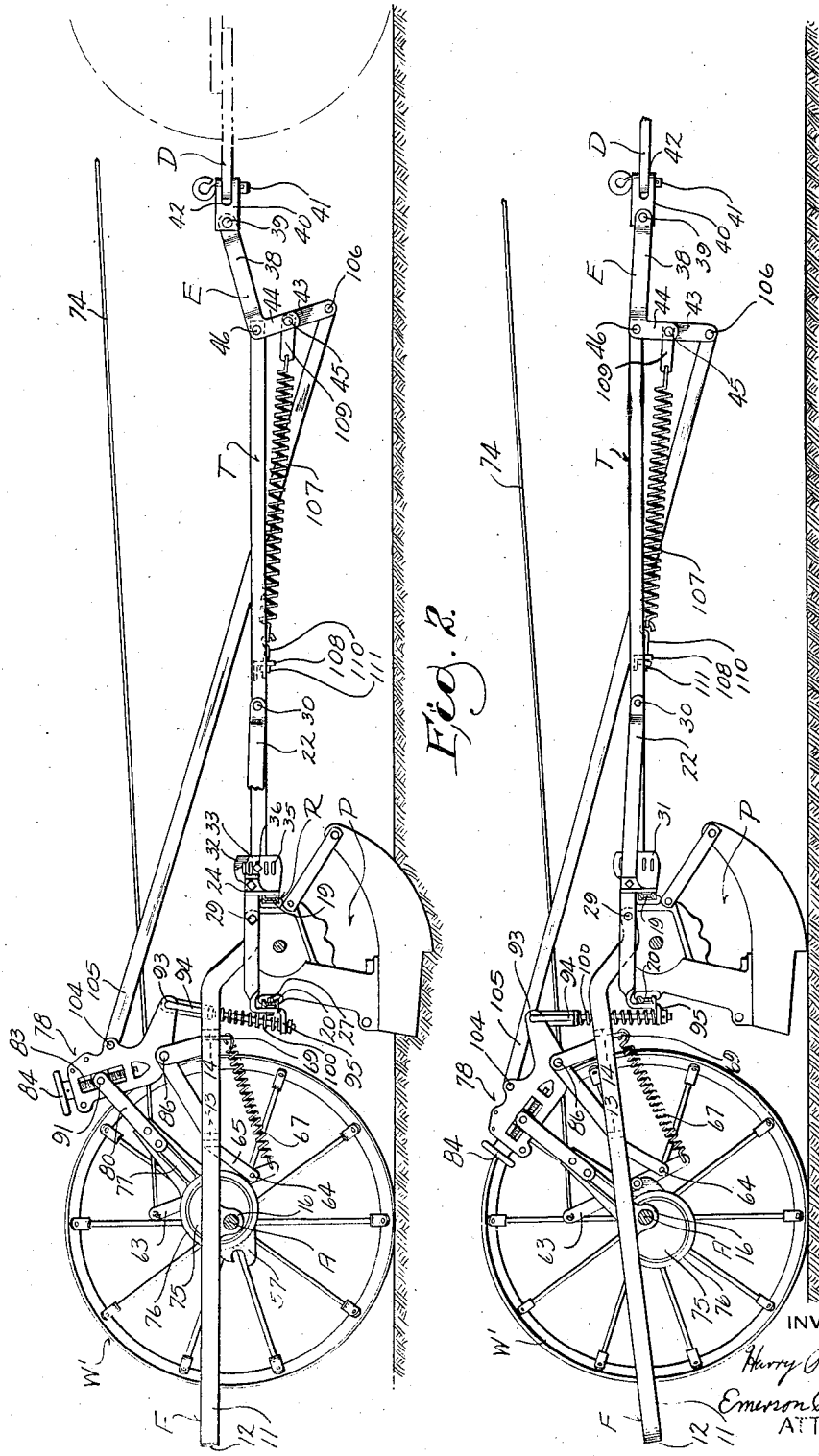

INVENTOR
Harry R Traphagen
Emerson B Donnell
ATTORNEY

Patented Dec. 11, 1945

2,390,968

UNITED STATES PATENT OFFICE 2,390,968

POWER LIFT PLANTER

Harry R. Traphagen, Rockford, Ill., assignor to J. I. Case Company, Racine, Wis., a corporation Application March 27, 1943, Serial No. 480,799

14 Claims. (Cl. 111—56)

The present invention relates to planters and particularly to improvements in implements of the corn planter type. Such planters commonly comprise a two-wheeled frame on which the check mechanism, seed hoppers, runner frame and runners are supported forwardly of the transverse axis of the wheels. These implements have, in the past, been drawn by horses, the driver riding upon the implement from which position he has control of the expedients provided for raising, lowering and adjusting the runner frame. When such an implement is drawn behind a tractor, the operator normally rides on the tractor and so it is desirable to have expedients for raising, lowering and adjusting the runner frame, at least the most important of which adjustments can be effected without leaving the tractor.

Moreover, when such planters are used for check-row planting, whether horse-drawn or tractor-drawn, it is important that there be no appreciable fore-and-aft swinging of the planter runners during depth adjustment in order to preserve accurate checking. For this reason, a front truck has been commonly provided to serve as a reference point from which certain of the adjustments originate. Since the tractor is heavy and stable, and insensitive to changes of weight imposed on the tongue of the implement, it is possible to eliminate such a front truck in a planter intended for tractor operation, thereby substantially simplifying the apparatus as well as providing improved operation and economy in manufacture.

An object of the invention is to generally improve the construction and operation of implements of the above class.

A further object is to provide such a planter which can be adjusted from a tractor drawing the implement.

A further object is to provide such a planter in which the tractor is utilized as a support and reference point for such adjustments.

A further object is to provide such a planter in which fore-and-aft shifting of the openers incident to such adjustment is avoided.

Further objects are to provide arrangements and expedients for realizing the above objects and further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

In the drawings,

Figure 1 is a plan view of a planter, partly diagrammatic in form, with parts removed and others broken away, illustrating the invention.

Fig. 2 is a side elevation of the same, partly in section along the line 2—2 of Fig. 1 and with parts broken away.

Fig. 3 is a similar view showing the parts in a different position.

Figure 6:
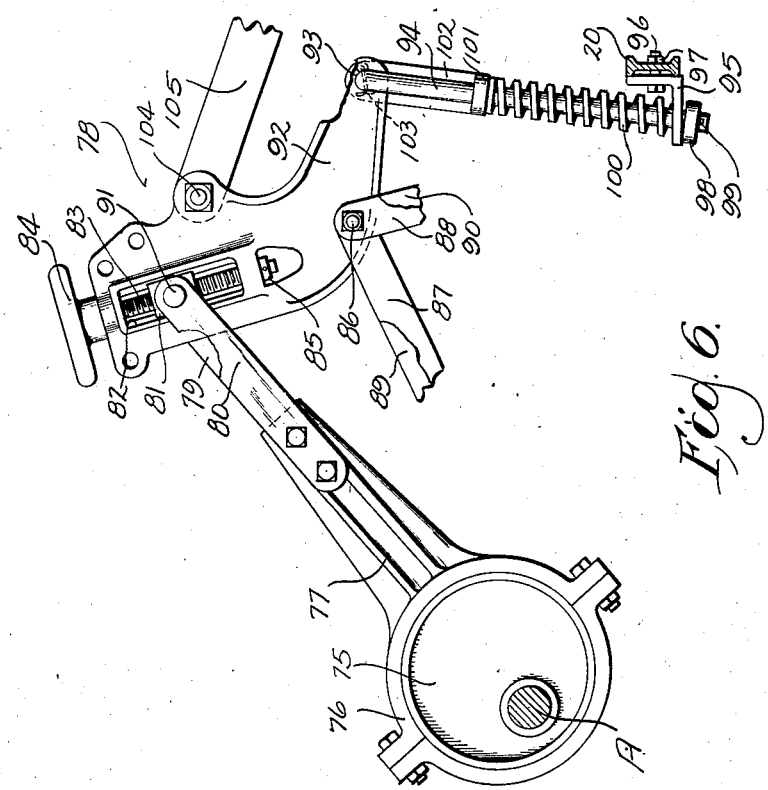
Fig. 6 is an enlarged detail of certain mechanism indicated in Figs. 2 and 3.

As seen in Fig. 1, the implement comprises a frame, generally designated as F, supported on an axle A, carried by wheels $W^1$ and $W^2$, frame F being joined to a runner frame R carrying a plurality of planter units P, runner frame R being connected with a tongue T having an extension E connected to the tractor draw bar D which serves to propel the planter and as a support for extension E, but otherwise forms no part of the present invention. Axle A carries a power lift unit L which serves to accomplish raising and lowering of runner frame R and which will be more fully described presently.

As will be apparent, the planter is supported from draw bar D and wheels $W^1$ and $W^2$, runner frame R and tongue T being carried between frame F and extension E with planter units P entering the ground to the desired extent. Power lift L operates as will appear to raise frame R and tongue T bodily relatively to wheels $W^1$ and $W^2$ and draw bar D, so that planters P are removed from the soil, the movement being a substantially parallel motion as indicated by comparison of Figs. 2 and 3. Depth adjustment of planters P therefore does not cause any appreciable fore-and-aft displacement thereof.

Returning to a more detailed description of the parts, frame F comprises side rails 10 and 11 and a rear cross member 12. Cross members 13 and 14 complete the frame which carries bearings 15 and 16 in which axle A is journaled, collars 17 and 18 in the present instance preventing axial shifting of the axle.

Runner frame R comprises front and rear cross rails 19 and 20 respectively, joined intermediate their ends by braces 21 and 22 united with rails 19 and 20 in any suitable or well-known manner as by angle plates 23 and 24. At their outer ends, bars 19 and 20 are united in the present instance by check fork units of suitable or well-known form 25 and 26, forming no part of the present invention and connected to planter units P in any well-known manner not shown. As shown in Fig. 2, braces 21 and 22 are united with rail 20 by suitable bolts, as for example bolt 27. Frame R is connected to above mentioned frame F by pivot bolts 28 and 29 whereby frame R may be raised and lowered with accompanying tilting movement of frame F about axle A, it being understood that means is provided for preventing tilting movement of frame R about pivots 28 and 29.

The latter is accomplished by tongue T which is connected with braces 21 and 22 by a pivot bolt 30 at a point spaced in advance of frame R. Tongue T projects rearwardly of pivot 30 and is adjustably united with frame R in the present instance by a clevis generally designated as 31 and having side plates 32 and 33. Clevis 31 is fixed to rail 19 by a bolt or the like 34 and plates 32 and 33 are provided with a plurality of openings 35, a clamping bolt 36 traversing aligned openings in the plates and also tongue T, thereby adjustably fixing the relation of tongue T to frame R. Tongue T may therefore be adjusted up or down as necessary to suit the height of draw bar D of the particular tractor to which the planter is to be attached, the tongue being rigid with frame R when bolt 36 is tightened in position.

Extension E in the present instance comprises angle plates 37 and 38 united by a pivot bolt 39 passing through a fitting 40 providing an opening for a coupling pin 41, passing through an opening in drawbar D. Fitting 40 is slotted at 42 for reception of draw bar D. Plates 37 and 38 have downwardly extending arms 43 and 44 respectively which are united by a bolt 45, extension E thereby being in effect a bell crank fulcrumed on tongue T by a pivot bolt 46. It will now be apparent that tongue T and frame R can be raised or lowered bodily and without tilting movement by suitably simultaneously rocking frame F and extension E, tractor draw bar D serving as a fixed reference point for plate 40 and accordingly the front end of extension 38. Such rocking of frame F and extension E is accomplished by power lift L as will now be described.

Figure 4:
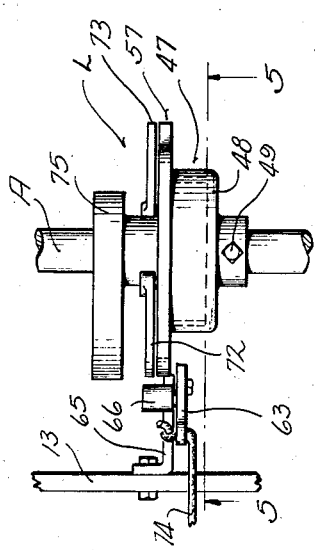
Fig. 4 is an enlarged plan view of certain mechanism indicated in Fig. 1, with parts removed.
Figure 5:
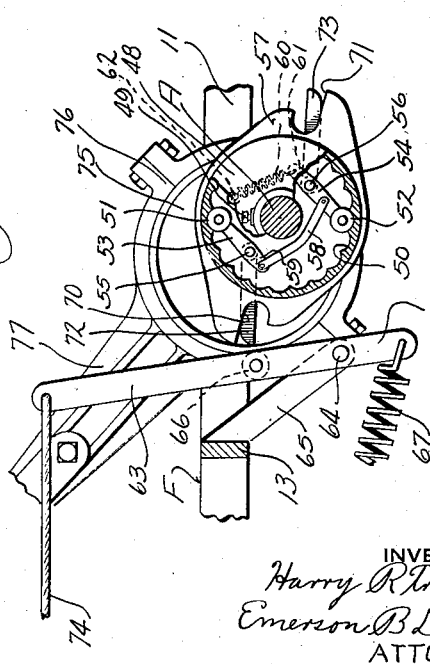
Fig. 5 is a vertical sectional view on the line 5—5 of Fig. 4.

As seen in Fig. 4, power lift L comprises a cyclic clutch, of well-known form, generally designated as 47 in the present instance carried on axle A. Such clutches are common and well-known and operate upon tripping to actuate a driven member through a predetermined fraction of a revolution. In the present instance clutch 47 includes a housing 48 fixed with axle A by a set screw 49 or the like and including an interior surface providing a plurality of recesses or scallops 50, Fig. 5. Recesses 50 are engaged by rollers 51 and 52 or other engaging means carried on arms 53 and 54. Arms 53 and 54 are fixed on pins 55 and 56 journaled in a cam plate generally designated as 57 so that rocking of said pins may remove rollers 51 and 52 from contact with recesses 50. A link 58 connects an extended portion 59 of arm 53 with arm 54 at a point spaced from pin 56 so that oscillation of the one will be communicated to the other, and a spring 60 engaging an extended portion 61 of arm 54 and anchored on a pin 62 tends at all times to swing arms 53 and 54 so as to maintain rollers 51 and 52 engaged in recesses 50. Under these conditions, cam plate 57 will be rotated with housing 48 whenever axle A is rotated. Most of the time, however, rollers 51 and 52 are held out of engagement with recesses 50 so that housing 48 rotates while cam plate 57 remains stationary.

A lever 63 fulcrumed on a pivot bolt 64 carried by an arm 65 fixed in the present instance to cross member 13, carries a roller or the like 66 which rides on the periphery of cam plate 57, urged thereagainst by a spring 67 in the present instance tensioned between an extension 68 of lever 63 and an anchorage 69, Fig. 2, on cross member 14. Cam plate 57 is provided with notches 70 and 71 which may be engaged by roller 66 to hold cam plate 57 stationary. Also pins 55 and 56 on the opposite side of cam plate 57, from arms 53 and 54, have arms 72 and 73 overlying notches 70 and 71 in position to contact roller 66 when the latter is about to enter notches 70 and 71. It will now be apparent that, with roller 66 traveling on cam plate 57, one or the other of arms 72 and 73 will contact roller 66 thereby shifting arms 53 and 54 so as to disengage rollers 51 and 52 from recesses 50. This disconnects cam plate 57 from the rotating housing 48 and the cam plate is locked in position by roller 66 engaging one or the other of notches 70 and 71. Lever 63 is connected with the tractor by any suitable expedient such as a rope 74, a momentary pull on which will disengage roller 66 and permit the initiation of the sequence of events just described. The above description is typical of clutches of this nature, different forms of which are well-known and it is not intended by this description to limit the invention to the exact details of the clutch shown and described.

It is advantageous to locate power lift L on axle A of the planter and, incident to this, cam plate 57 has suitably attached thereto an eccentric sheave or actuating unit 75 for transmitting the cyclic movement of cam plate 57 to the parts to be controlled. In this manner, the power lift is mounted on the strongest part of the mechanism and the driving power of both wheels, $W^1$ and $W^2$ is available if desired for effecting the lifting movement. Sheave 75 has an eccentric strip generally designated as 76 surrounding the sheave and partaking of its eccentric movement and having an arm 77, extending upwardly to a rocker generally designated as 78. Arm 77 has extension plates 79 and 80 between which arm 77 is engaged and which pass respectively on opposite sides of rocker 78, as more particularly shown in Fig. 6. Plates 79 and 80 engage a slide block 81, guided in a slot 82 in above mentioned rocker 78, and the position of which in slot 82 may be adjusted by a screw 83 journaled in rocker 78 and held against axial movement by a hand wheel 84 and a collar 85. Rocker 78 is fulcrumed on a pivot bolt 86 carried by braces 87 and 88, fixed respectively with cross members 13 and 14, similar braces 89 and 90 being provided and similarly supported on the opposite side of rocker 78. Block 81 is provided with trunnions as for example 91, engaged by above mentioned plates 79 and 80 thereby providing a pivotal connection between arm 77 and rocker 78 and which may be adjusted to positions at different distances from fulcrum 86. Thus, the amount of rocking of rocker 78 caused by the throw of eccentric 75 can be changed at will. This regulates the depth of penetration of planting units P as will appear.

Rocker 78 is provided with an arm portion 92 extending generally forwardly and in which is journaled a pivot portion 93 of a rod 94 which extends downwardly and connects with a bracket 95 fixed with cross rail 20 of runner frame R by suitable means such as a bolt 96 and nut 97. Rod 94 is arranged to exert a lifting effect on bracket 95, in the present instance passing through the bracket and having a collar or the like 98 maintained in contact with bracket 95 by a spring 100 compressed between bracket 95 and an abutment plate 101 on rod 94 and having an upwardly extending portion 102 through which passes above mentioned journal 93. In this way, an effective anchorage for plate 101 is provided. Suitable means such as a cotter pin 103 prevents inadvertent removal of portion 102. Runner frame R is accordingly free to rise upon compression of spring 100 in case of encountering an obstruction.

Counterclockwise rocking of rocker 78 as seen in Figs. 2, 3 and 6 causes a resultant lifting force on frame R which will raise it concurrently with a counterclockwise tilting movement of frame F. Rocker 78 also has a pivot bolt 104 by means of which a link 105 is connected therewith for fore-and-aft movement. Link 105 connects rocker 78 with above mentioned arm 43 by means of a pivot bolt 106. Accordingly, counterclockwise rocking of rocker 78 causes a generally rearward movement of link 105 and clockwise rocking of extension 38. This will cause upward movement of pivot point 46 concurrently with the raising of frame R, so that the parts will assume the position indicated in Fig. 3 which is substantially the transport position.

An assisting spring 107 is tensioned between an anchorage 108 and a link 109 pivoted on above mentioned bolt 45 tending to continuously rotate extension 38 in a clockwise direction and thereby assist the action just described. Spring 107 is connected with a bolt 110 having a nut 111, the manipulation of which will adjust the tension of spring 107, and the spring is preferably, although not necessarily, so adjusted as to exert sufficient force to lift the planter, so that the power lift is relieved of substantially all work when the planter is raised, but exerts its major force when the planter is to be lowered, in overcoming spring 107.

It will be noted that in the position of the parts shown in Fig. 3, screw 83 is substantially at right angles to arm 77. Adjustment of the screw will therefore have substantially no effect upon the position of the parts. Thus the runner frame R will be lifted to substantially the same position regardless of the adjustment of screw 83. On the other hand, in the planting position, there is an appreciable angle between screw 83 and arm 77 so that adjustment of the screw will cause a change in position of rocker 78 and accordingly in the position of runner frame R.

As will be apparent, a pull on rope 74 will cause a half turn in eccentric 75 and a change from whichever position the parts occupy in Figs. 2 and 3 to the opposite. It is to be noted that this change is effected with a substantially parallel movement of rocker frame R so that no appreciable fore-and-aft shifting of planter units P occurs with relation to check mechanism 25 and 26. It will thus be seen that expedients have been provided for realizing the objects heretofore stated.

The above being a complete description of an illustrative embodiment of the invention, what is claimed as new and desired to be secured by Letters Patent of the United States is:

1. In a planter, a wheeled frame including an axle, wheels for supporting the axle and rotating it, a runner frame pivoted to the wheeled frame, a tongue rigid with the runner frame, a power lift on the axle, connections for tilting the wheeled frame from the action of the power lift including a rocker member pivoted on the wheeled frame, a connection from the power lift to the rocker, an extension pivoted on said tongue, a connection from the rocker to the runner frame, and a link connecting said rocker and extension for swinging said extension in response to rocking of said rocker.

2. In an agricultural implement, the combination of a wheel supported frame, and a runner frame provided with furrow opening means, and having a tongue for attachment to a tractor, means connecting said frames for relative pivotal movement, an extension pivoted to said tongue and interposed between it and said tractor, and means including a rocker lever pivoted on said wheel supported frame and connected to said runner frame for raising and lowering the latter frame and said furrow opening means, and a connection from said rocker lever to said tongue extension for raising and lowering said tongue relatively to said tractor for causing substantially rectilineal up-and-down movement of said frame and tongue relatively to said tractor, when raising and lowering said runner frame.

3. In a planter, a wheeled frame including an axle, wheels for supporting the axle and rotating it, a runner frame pivoted to the wheeled frame, a tongue rigid with the runner frame, a power lift clutch having a rotating unit fixed on the axle and a normally stationary actuating unit journaled on the axle, connections for tilting the wheeled frame from the action of said normally stationary actuating unit of the power lift, including a rocker member pivoted on the wheeled frame, a link connecting said rocker member with the runner frame, and a connection from said normally stationary actuating unit to said rocker member for rocking it upon actuation of said unit.

4. In a planter, a wheeled frame including an axle, wheels for supporting the axle and rotating it, a runner frame pivoted to the wheeled frame, a tongue rigid with the runner frame, a power lift clutch having a rotating unit fixed on the axle and a normally stationary actuating unit journaled on the axle, connections for tilting the wheeled frame from the action of said normally stationary actuating unit of the power lift for lifting the runner frame including a rocker member pivoted on the wheeled frame and a connection from said normally stationary actuating unit to said rocker member for rocking it upon actuation of said unit.

5. In a planter, a wheeled frame including an axle, wheels for supporting the axle and rotating it, a runner frame pivoted to the wheeled frame, a tongue rigid with the runner frame, a power lift clutch having a rotating unit fixed on the axle and a normally stationary actuating unit journalled on the axle, connections for tilting the wheeled frame from the action of said normally stationary actuating unit of the power lift including a connection from said normally stationary actuating unit on the axle to said runner frame.

6. In a planter, a wheeled frame including an axle, wheels for supporting the axle and rotating it, a runner frame pivoted to the wheeled frame, a tongue rigid with the runner frame, a power lift on the axle, connections for tilting the wheeled frame from the action of the power lift including a rocker member pivoted on the wheeled frame, an extension pivoted on said tongue, a link connecting said rocker and extension for swinging said extension in response to rocking of said rocker, a link connecting said rocker with said power lift and said power lift having a normally nonrotative eccentric journaled on said axle and connected through the last mentioned link with said rocker, and adapted to be momentarily connected for rotation with said axle for actuating said rocker.

7. In a planter, a wheeled frame including an axle, wheels for supporting the axle and rotating it, a runner frame pivoted to the wheeled frame, a tongue rigid with the runner frame, a power lift on the axle, connections for tilting the wheeled frame from the action of the power lift including a rocker member pivoted on the wheeled frame, an extension pivoted on said tongue, a link connecting said rocker and extension for swinging said extension in response to rocking of said rocker, a link connecting said rocker with said power lift and said power lift having a normally nonrotative eccentric journaled on said axle and connected through the last mentioned link with said rocker, and adapted to be momentarily connected for rotation with said axle for actuating said rocker, said last mentioned link having its point of connection with said rocker adjustable substantially in the direction of a radius from the pivot of said rocker at right angles to the direction of said link in its mid-position of adjustment.

8. In a planter, a wheeled frame including an axle, wheels for supporting the axle and rotating it, a runner frame pivoted to the wheeled frame, a tongue rigid with the runner frame, a power lift on the axle, connections for tilting the wheeled frame from the action of the power lift including a rocker member pivoted on the wheeled frame, an extension pivoted on said tongue, a link connecting said rocker and extension for swinging said extension in response to rocking of said rocker, a link connecting said rocker with said power lift and said power lift having a normally nonrotative eccentric journaled on said axle and connected through the last mentioned link with said rocker, and adapted to be momentarily connected for rotation with said axle for actuating said rocker, said last mentioned link having its point of connection with said rocker adjustable substantially in the direction of a radius from the pivot of said rocker at right angles to the direction of said link in its mid-position of adjustment, and an assisting spring acting on said extension for assisting said power lift in raising said runner frame.

9. In a planter, a wheeled frame including an axle, wheels for supporting the axle and rotating it, a runner frame pivoted to the wheeled frame, a tongue rigid with the runner frame, a power lift on the axle and having a normally nonrotative eccentric journaled on said axle and connected with said runner frame for raising said runner frame upon rotation of said eccentric and being adapted to be momentarily connected for rotation with said axle for raising or lowering said runner frame.

10. In a planter, a wheeled frame including an axle, wheels for supporting the axle and rotating it, a runner frame pivoted to the wheeled frame, a tongue rigid with the runner frame, a power lift on the axle, connections for tilting the wheeled frame frame from the action of the power lift including a rocker member pivoted on the wheeled frame, an extension pivoted on said tongue, a link connecting said rocker and extension for swinging said extension in response to rocking of said rocker, a link connecting said rocker with said power lift and said power lift having a normally nonrotative eccentric journaled on said axle, connected through the last mentioned link with said rocker, and adapted to be momentarily connected for rotation with said axle for actuating said rocker, and an assisting spring acting on said extension for assisting said power lift in raising said runner frame.

11. In a planter, a wheeled frame including an axle, wheels for supporting the axle and rotating it, a runner frame pivoted to the wheeled frame, a tongue rigid with the runner frame, a power lift on the axle, connections for tilting the wheeled frame from the action of the power lift including a rocker member pivoted on the wheeled frame, a connection from the power lift to the rocker, an extension pivoted on said tongue, a connection from the rocker to the runner frame, a link connecting said rocker and extension for swinging said extension in response to rocking of said rocker, and an assisting spring acting on said extension for assisting said power lift in raising said runner frame.

12. In a planter, a wheeled frame including an axle, wheels for supporting the axle and rotating it, a tongue connected with the frame and an extension pivoted on said tongue and extending forwardly therefrom for connection to a draft unit, an arm extending transversely from said extension, a power lift on said frame and a link extending from said power lift and connected to said arm for swinging said extension in response to action of said power lift.

13. In a planter, a wheeled frame including an axle, wheels for supporting the axle and rotating it, a tongue connected with the frame and an extension pivoted on said tongue and extending forwardly therefrom for connection to a draft unit, an arm extending transversely from said extension, a power lift on said frame, a link extending from said power lift and connected to said arm for swinging said extension in response to action of said power lift, and an assisting spring connected to said arm for assisting said power lift in swinging said extension.

14. In a planter having a forwardly extending tongue, a bifurcated extension pivotally connected to said tongue, extending forwardly therefrom and having spaced downwardly extending arms, means connecting said arms downwardly spaced from the pivotal connection, power lift means pivotally connected to one of said arms for swinging said extension, and an assisting spring secured to said connecting means for assisting said power lift in swinging said extension.

HARRY R. TRAPHAGEN.